(12) United States Patent
Cho et al.

(10) Patent No.: US 10,873,134 B1
(45) Date of Patent: Dec. 22, 2020

(54) SPATIAL MODULATION-BASED TRANSMITTER AND COMMUNICATION METHOD EMPLOYING LENS ANTENNA

(71) Applicant: KOREA ADVANCED INSTITUTE OF SCIENCE AND TECHNOLOGY, Daejeon (KR)

(72) Inventors: Dong Ho Cho, Daejeon (KR); Gang Minh Lee, Daejeon (KR); Yun Sik Kim, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 16/723,266

(22) Filed: Dec. 20, 2019

(30) Foreign Application Priority Data

May 30, 2019 (KR) .................. 10-2019-0063690

(51) Int. Cl.
| | |
|---|---|
| *H04B 1/04* | (2006.01) |
| *H01Q 15/02* | (2006.01) |
| *H04B 7/0413* | (2017.01) |
| *H01Q 21/06* | (2006.01) |
| *H04J 99/00* | (2009.01) |

(52) U.S. Cl.
CPC ............. *H01Q 15/02* (2013.01); *H01Q 21/06* (2013.01); *H04B 1/0483* (2013.01); *H04B 7/0413* (2013.01); *H04J 15/00* (2013.01)

(58) Field of Classification Search
CPC ........ H01Q 15/00; H01Q 15/02; H01Q 15/04; H01Q 21/00; H01Q 21/06; H01Q 3/26; H01Q 3/32; H01Q 3/34; H01Q 3/36; H01Q 3/38; H01Q 3/44; H01Q 3/46;
(Continued)

(56) References Cited

U.S. PATENT DOCUMENTS

| | | | |
|---|---|---|---|
| 2014/0145887 A1* | 5/2014 | Irvine ..................... | H01Q 1/27 343/713 |
| 2018/0269576 A1* | 9/2018 | Scarborough ............ | H01Q 3/30 |

(Continued)

FOREIGN PATENT DOCUMENTS

| | | |
|---|---|---|
| KR | 10-1560499 B1 | 10/2015 |
| KR | 10-1926986 B1 | 12/2018 |

OTHER PUBLICATIONS

Korean Office Action for related KR Application No. 10-2019-0063690 dated Dec. 21, 2019 from Korean Intellectual Property Office.

*Primary Examiner* — Siu M Lee
(74) *Attorney, Agent, or Firm* — Paratus Law Group, PLLC

(57) ABSTRACT

Disclosed are a spatial modulation-based transmitter and communication method employing a lens antenna. The spatial modulation-based transmitter includes a plurality of unit antennas, a modulator configured to perform non-orthogonal multiple access and spatial modulation for an input signal, and a controller configured to determine a target unit antenna which will transmit data in a spatial modulation manner at a current time point among the plurality of unit antennas. Each of the unit antennas includes a plurality of antenna units and a lens structure which shifts a phase of an electromagnetic wave output by at least one of the plurality of antenna units. The lens structure shifts the phase so that the plurality of antenna units may have different radiation patterns.

18 Claims, 13 Drawing Sheets

(58) Field of Classification Search
CPC ......... H01Q 19/00; H01Q 19/06; H04J 15/00; H04B 1/0483; H04B 7/0413
See application file for complete search history.

(56) References Cited

U.S. PATENT DOCUMENTS

| | | | |
|---|---|---|---|
| 2019/0006748 A1* | 1/2019 | Cho | H01Q 15/02 |
| 2019/0319363 A1* | 10/2019 | Ko | H01Q 21/0031 |
| 2020/0119776 A1* | 4/2020 | Lorca Hernando | H04W 28/06 |

* cited by examiner

FIG. 4
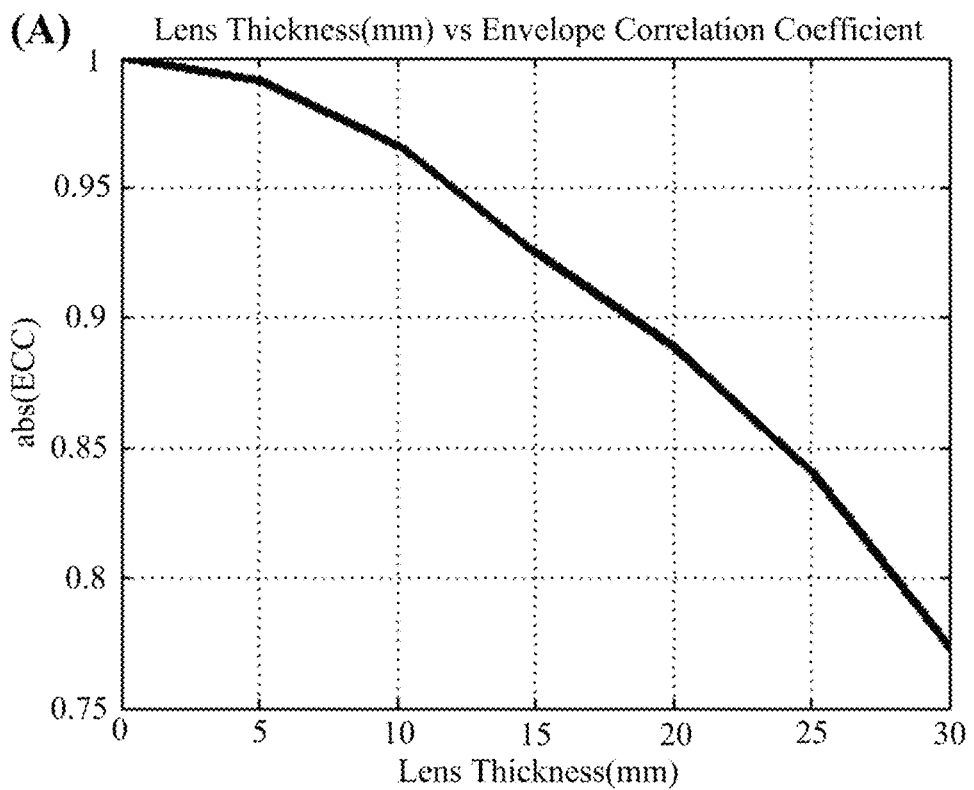
(A) Lens Thickness(mm) vs Envelope Correlation Coefficient
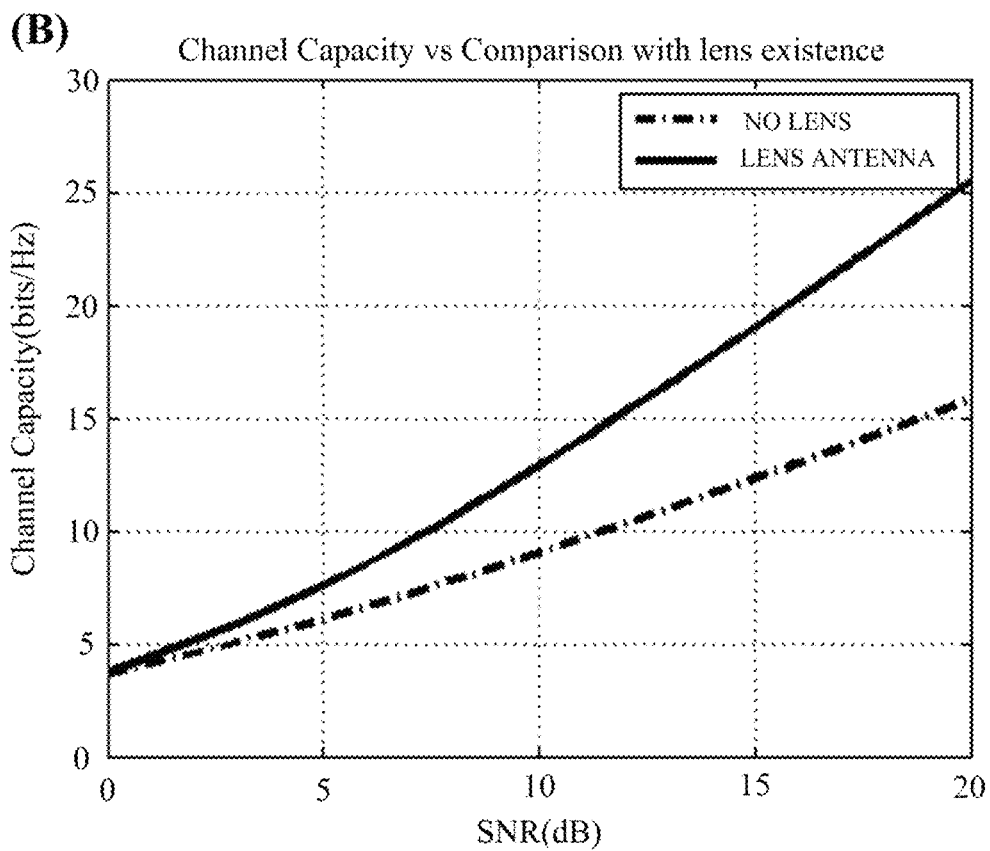
(B) Channel Capacity vs Comparison with lens existence

FIG. 5

| | | ABSOLUTE VALUE OF CORRELATION MATRIX | | | | EIGENVALUE OF CORRELATION MATRIX |
|---|---|---|---|---|---|---|
| | | $P_1$ | $P_2$ | $P_3$ | $P_4$ | |
| LENS ANTENNA (100) | $P_1$ | 1.000 | 0.011 | 0.728 | 0.029 | 1.6814 |
| | $P_2$ | 0.011 | 1.000 | 0.029 | 0.729 | 1.6205 |
| | $P_3$ | 0.728 | 0.029 | 1.000 | 0.022 | 1.4328 |
| | $P_4$ | 0.029 | 0.729 | 0.022 | 1.000 | 1.3936 |
| GENERAL ANTENNA (50) | $P_1$ | 1.000 | 0.011 | 0.945 | 0.011 | 3.7824 |
| | $P_2$ | 0.011 | 1.000 | 0.011 | 0.945 | 3.7818 |
| | $P_3$ | 0.945 | 0.011 | 1.000 | 0.011 | 0.006 |
| | $P_4$ | 0.011 | 0.945 | 0.011 | 1.000 | 0.0011 |

FIG. 6
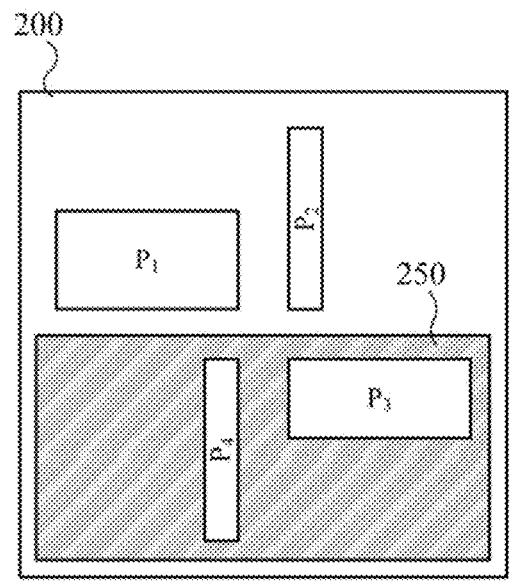
(a)
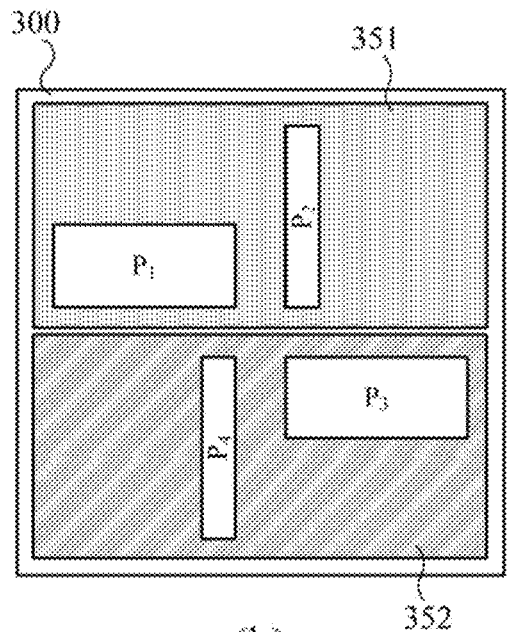
(b)
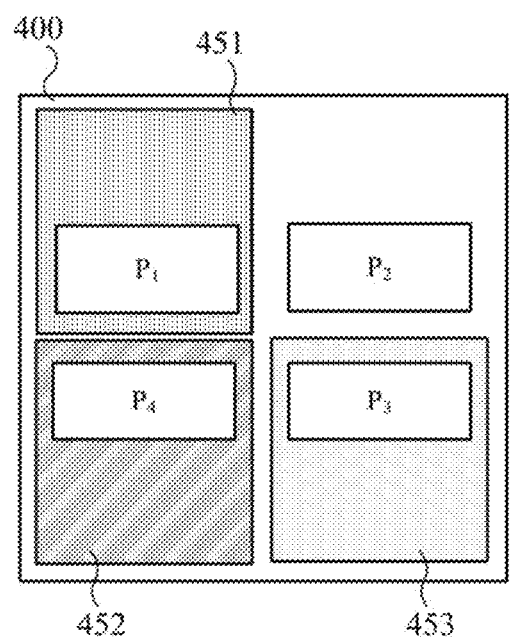
(c)
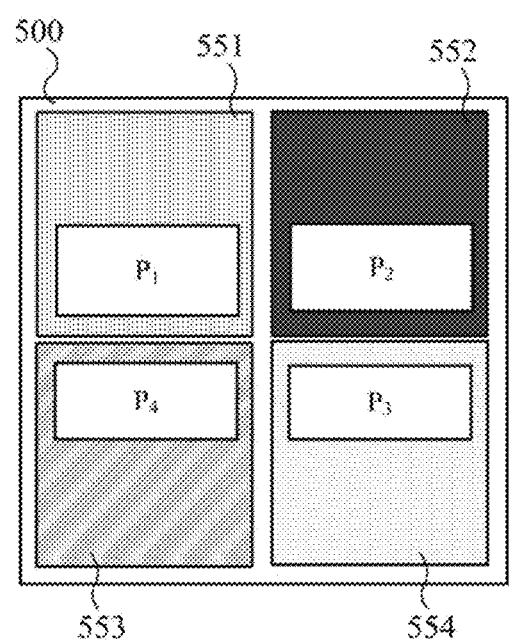
(d)

FIG. 10
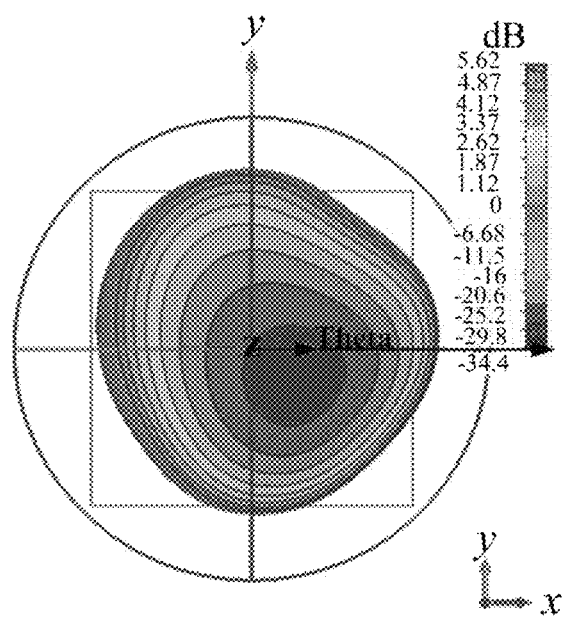
(A)
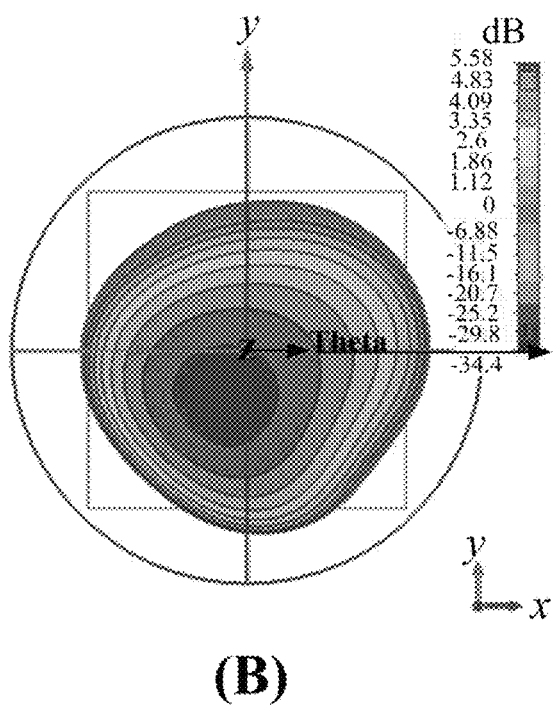
(B)
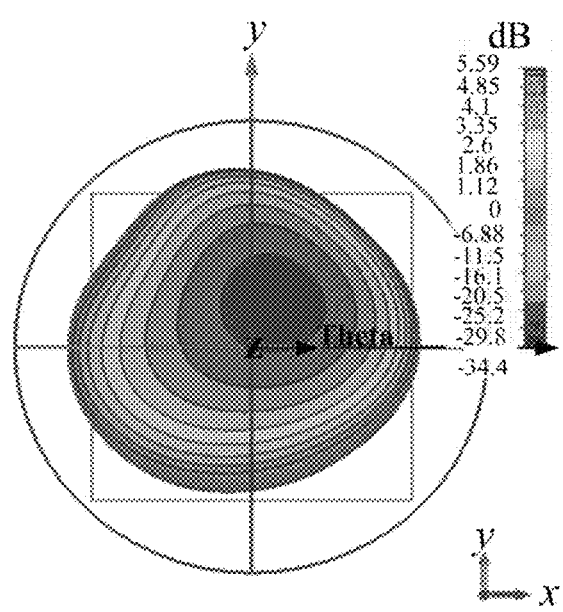
(C)
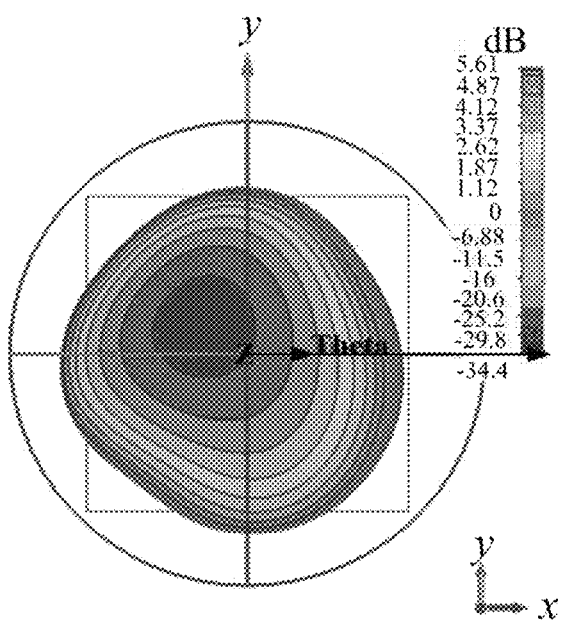
(D)

SPATIAL MODULATION-BASED TRANSMITTER AND COMMUNICATION METHOD EMPLOYING LENS ANTENNA

CROSS-REFERENCE TO RELATED APPLICATION

This application claims priority to Korean Patent Application No. 10-2019-0063690 filed on May 30, 2019 under 35 U.S.C. § 119(a), which is hereby incorporated by reference in its entirety.

BACKGROUND

The following description relates to a communication technique employing an integrated multi-lens antenna and more particularly, to a spatial modulation (SM)-based transmitter and communication method employing a lens antenna.

A method was proposed to increase channel capacity by integrating many antennas in a limited space through the use of SM technology in an existing cellular band. In using the SM technology, only a selected antenna group is used. Also, signals directed in the same direction are separated without interference by using unique characteristics of pattern or polarized antenna radiation patterns, or signals are distinguished from each other according to the forms of wave surfaces by using the orbital angular momentum technique, so that additional capacity gain may be obtained.

Multiple-input multiple-output (MIMO) gain from pattern or polarization gain has been researched as a method for integrating multiple antennas in a limited space in the antenna field. In the case of SM systems, research has been conducted as a method for efficiently selecting and using multiple antennas.

To obtain a higher MIMO gain, research has been conducted on a method of improving the degree of integration by using pattern characteristics. According to the method, the radiation patterns of antennas are differently designed to reduce the degree of correlation between the radiation patterns of antennas. In this way, research has been conducted to improve channel independence and obtain increased channel capacity.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an SM-based transmitter employing a lens antenna includes: a plurality of unit antennas; a modulator configured to perform NOMA and SM for an input signal; and a controller configured to determine a target unit antenna which will transmit data in an SM manner at a current time point among the plurality of unit antennas. Each of the unit antennas includes a plurality of antenna units and a lens structure which shifts a phase of an electromagnetic wave output by at least one of the plurality of antenna units. The lens structure shifts the phase so that the plurality of antenna units may have different radiation patterns.

In another aspect, there is provided a an SM-based communication method employing a lens antenna includes: performing, by a multi-antenna system, NOMA and SM for an input signal; determining, by the multi-antenna system, a target unit antenna which will transmit data in an SM manner at a current time point among a plurality of unit antennas; and transmitting, by the multi-antenna system, spatially modulated data through the target unit antenna. Each of the unit antennas includes a plurality of antenna units and a lens structure which shifts a phase of an electromagnetic wave output by at least one of the plurality of antenna units. The lens structure shifts the phase so that the plurality of antenna units may have different radiation patterns.

BRIEF DESCRIPTION OF THE DRAWINGS

FIG. 4 illustrates an example of a graph showing channel capacity of a 4-port integrated antenna including a lens structure.

FIG. 5 illustrates an example of a table for analyzing the degrees of correlation of a 4-port integrated antenna including a lens structure.

FIG. 6 illustrates a set of examples showing the structure of a lens antenna.

FIG. 10 illustrates examples of radiation patterns of the 4-port integrated antenna of FIG. 9.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
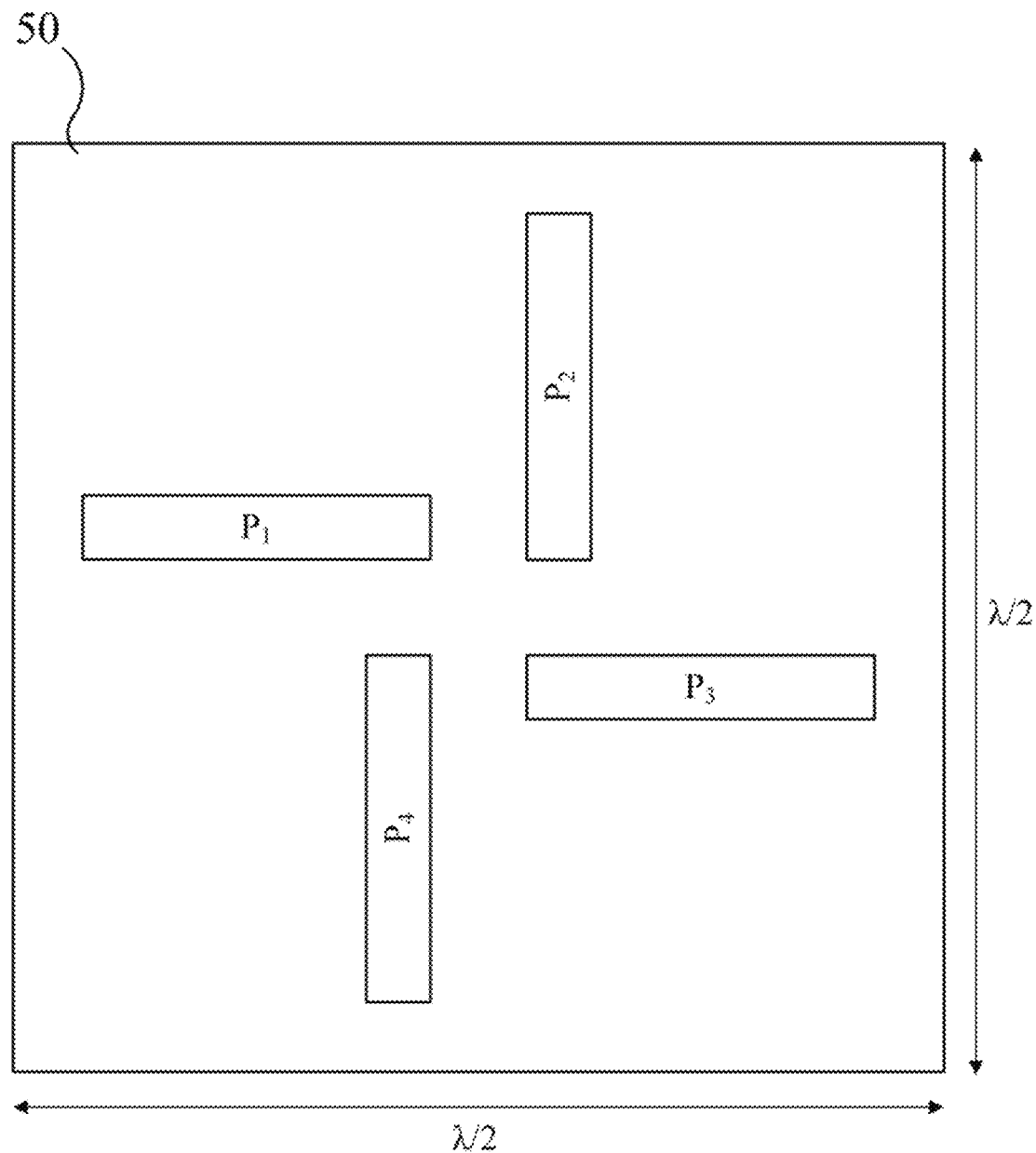
FIG. 1 illustrates an example of an existing 4-port integrated antenna.

As the present disclosure allows a variety of changes and have various embodiments, particular embodiments will be illustrated in the drawings and described in detail. However, this is not intended to limit the present disclosure to particular modes of practice, and it is to be understood that all modifications, equivalents, and substitutes included in the spirit and technical scope of the present disclosure are encompassed in the present disclosure.

While the terms "first," "second," "A," "B," etc. may be used to describe various elements, these elements are not limited to the above terms. The terms are used only to distinguish one element from another. For example, without departing from the scope of the present disclosure a first element may be termed a second element, and similarly, the second element may be termed the first element. The term "and/or" includes any or all combinations of a plurality of listed relevant items.

As used herein, the singular forms are intended to include the plural forms as well, unless the context clearly indicates otherwise. It will be further understood that the terms "comprise," "include," and "have," when used herein, specify the presence of stated features, integers, steps, operations, elements, parts, or combinations thereof, but do not preclude the presence or addition of one or more other features, integers, steps, operations, elements, parts, or combinations thereof.

Before describing the drawings in detail, it should be noted that the distinction of elements is for distinguishing the main function of each element. In other words, two or more elements to be described below may be joined as one element, or an element may be functionally divided into two or more elements. Each element to be described below may perform not only its main function but also some or all of the functions of other elements, and some of the main functions pertained to each element may be fully performed by other elements.

In addition, in performing a method or an operational method, individual processes constituting the method may be performed in an order different from a specified order unless a specific order is clearly described in the context. In other words, individual processes may be performed in the specified order, performed substantially simultaneously, or performed in reverse order.

The present disclosure relates to an antenna system including a lens structure. Hereinafter, an antenna system including a lens structure is referred to as a lens antenna. A lens antenna basically includes a plurality of antenna units. One antenna unit emits electromagnetic waves in a uniform radiation pattern. A lens antenna described below has a structure in which a plurality of antenna units are integrated in one apparatus. The lens antenna described below may be a two-dimensional planar antenna or a three-dimensional antenna. For convenience of description, however, a two-dimensional planar antenna will be mainly described.

The present disclosure employs non-orthogonal multiple access (NOMA) and spatial modulation (SM) to increase channel gain. Existing NOMA systems increase channel capacity but have a problem in that there is interference between users (terminals). To solve this problem, receiving ends basically use successive interference cancellation (SIC). However, even interference cancellation at a receiving end causes overhead, and thus research is underway to solve the interference problem of NOMA in another way.

The SM technology may be applied to a NOMA system. SM based on multiple antennas activates only one transmission antenna to solve the problem of inter-antenna interference. However, when SM is applied to a NOMA system in the environment of an existing antenna structure, channel capacity is considerably reduced. The reason is that the NOMA system simultaneously transmits signals to multiple users in the same frequency band, but the number of antennas capable of simultaneously performing transmission is limited when SM is applied.

The present disclosure employs a lens antenna and thus maintains high channel capacity while applying SM to a NOMA system. The present disclosure proposes a method of further integrating antennas in the same area while using SM. Hereinafter a lens antenna and a communication technique employing the lens antenna will be described.

The present disclosure may be applied to various forms of antennas. For convenience of description, however, a 4-port integrated antenna will be mainly described.

FIG. 1 is an example of an existing 4-port integrated antenna 50. The antenna 50 includes a plurality of antenna units $P_1$, $P_2$, $P_3$, and $P_4$. The antenna 50 has a structure in which the antenna units $P_1$, $P_2$, $P_3$, and $P_4$ having a general deflection angle are rotated by 90 degrees each. The antenna units $P_1$ and $P_3$ are antennas having identical or similar polarization characteristics (e.g., vertically polarized (V-pol) antennas), and the antenna units $P_2$ and $P_4$ are antennas having identical or similar polarization characteristics (e.g., horizontally polarized (H-pol) antennas). In the case of the integration structure of the antenna 50, antenna units having an interval of 90 degrees (e.g., $P_1$ and $P_2$) have a low degree of correlation, but antenna units having an interval of 180 degrees (e.g., $P_1$ and $P_3$) have a relatively high degree of correlation due to polarization elements despite having a deflection angle. Here, the term "degree of correlation" refers to the degree of correlation between radiation patterns output by antennas. Antenna units having a high degree of correlation (e.g., $P_1$ and $P_3$) cause the rank of a channel matrix to be reduced. Accordingly, the antenna 50 having such antenna units does not ensure independence between signals, and thus it is difficult to obtain multiple gains.

Figure 2:
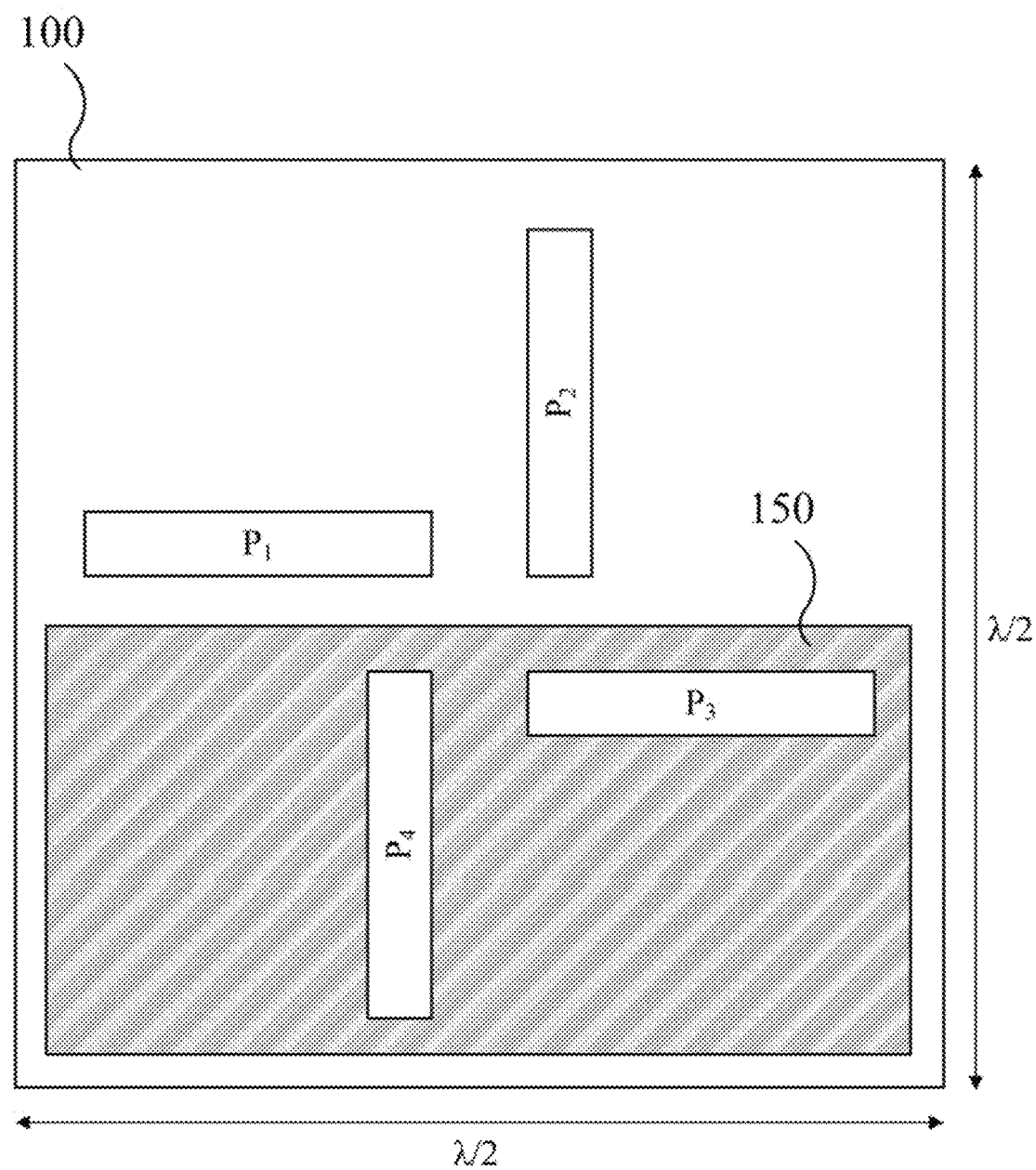
FIG. 2 illustrates an example of a 4-port integrated antenna including a lens structure.

FIG. 2 is an example of a 4-port integrated antenna 100 including a lens structure. The antenna 100 includes a plurality of antenna units $P_1$, $P_2$, $P_3$, and $P_4$. Basically, the antenna 100 is a 4-port integrated antenna having a structure similar to that of the antenna 50 shown in FIG. 1.

Additionally, the antenna 100 includes a lens structure 150. The lens structure 150 is a dielectric having a specific permittivity. The lens structure 150 may be a dielectric having at least one of a permittivity greater than or equal to a certain value and a permeability greater than or equal to a certain value. The lens structure 150 may have various shapes. For example, the lens structure 150 may have a planar shape (substrate) with a constant thickness. The antenna units $P_1$, $P_2$, $P_3$, and $P_4$ emit electromagnetic waves. The electromagnetic waves emitted from the antenna units pass through the lens structure 150. The antenna 100 has a structure in which only electromagnetic waves emitted from some antenna units $P_3$ and $P_4$ pass through the lens structure 150. The lens structure 150 is disposed at a position at which only electromagnetic waves emitted from the antenna units $P_3$ and $P_4$ pass through the lens structure 150.

Figure 3:
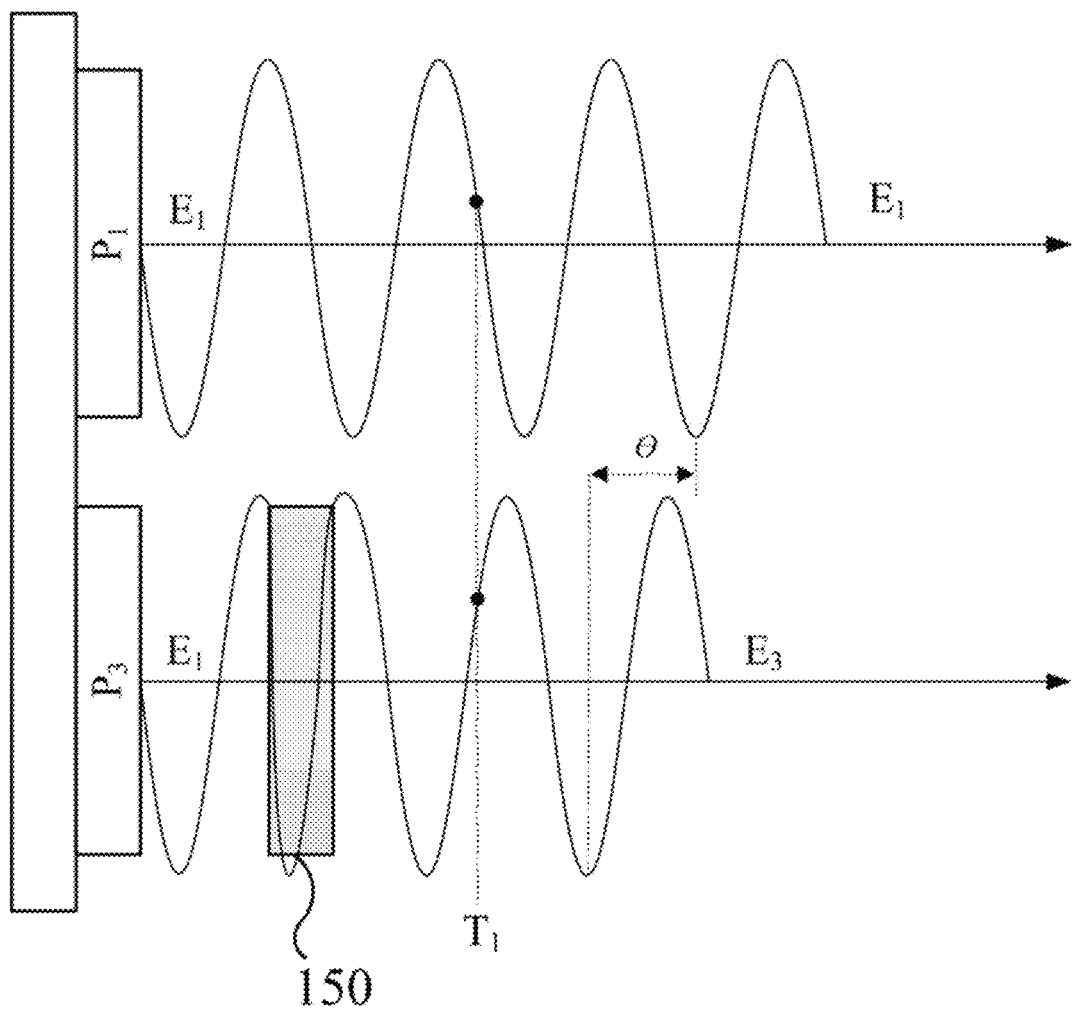
FIG. 3 illustrates an example of an electromagnetic wave passing through a lens.

FIG. 3 is an example of an electromagnetic wave passing through a lens. FIG. 3 illustrates an example of electromagnetic waves emitted from the antenna units $P_1$ and $P_3$ in the antenna 100 of FIG. 2. It is assumed that the antenna units $P_1$ and $P_3$ generally output electromagnetic waves $E_1$ with the same radiation pattern.

Since an electromagnetic wave signal is a complex signal rather than a mere real number, the transmitted signal has not only a magnitude but also phase information. When the phase information of an antenna is changed, an envelope correlation coefficient ρ, which is defined as the degree of correlation between antenna radiation patterns in Equation 1, has a reduced numerator thereof, and thus the degree of antenna correlation is reduced. As a result, the rank of a channel matrix H including interference between antennas is improved, and channel capacity is increased.

$$\rho = \frac{\left| \iint \vec{F_1} \cdot \vec{F_2^*} d\Omega \right|^2}{\iint |\vec{F_1}|^2 d\Omega \cdot \iint |\vec{F_2}|^2 d\Omega}$$ [Equation 1]

The antenna unit $P_1$ outputs an electromagnetic wave having a wavelength of $d_1$. The antenna unit $P_3$ also outputs an electromagnetic wave having a wavelength of $d_1$. When the lens structure 150 is disposed in front of the antenna unit $P_3$ and electrical loss of the lens is ignored, an electromagnetic wave signal generated by the antenna unit $P_3$ is affected by the thickness of the lens structure 150 so that phase information of the electromagnetic wave is changed. The electromagnetic wave output by the antenna unit $P_3$ slows down in the lens structure 150. Accordingly, an electromagnetic wave $E_3$ which has passed through the lens structure 150 has a constant phase difference θ from an electromagnetic wave $E_1$ output by the antenna unit $P_1$. Also, electromagnetic waves emitted from the antenna units $P_1$ and $P_3$ have the same phase before the electromagnetic waves of the antenna units $P_1$ and $P_3$ pass through the lens structure 150, but the phases thereof totally differ from each other at a time point $T_1$ after the electromagnetic waves of the antenna units $P_1$ and $P_3$ pass through the lens structure 150. In this way, the antenna 100 reduces the degree of correlation between antenna units (e.g., $P_1$ and $P_3$) through the lens structure 150, thereby increasing the channel capacity.

FIG. 4 provides examples of a graph showing a relationship between the thickness of a lens structure and a radiation pattern and a graph showing the channel capacity of a 4-port integrated antenna including a lens structure.

FIG. 4A is an example of a graph showing a relationship between the thickness of a lens structure and a radiation pattern. Referring to FIG. 2 by way of example, when the thickness of the lens structure 150 having a constant permittivity is changed, the degree of correlation between radiation patterns emitted from antenna units (e.g., $P_1$ and $P_3$) is also changed. As the thickness of the lens structure 150 increases, the degree of correlation is further reduced. This is because the thicker the lens structure 150, the phase information of an electromagnetic wave passing through the lens structure 150 is changed more. Referring to FIG. 4A, a material of the lens structure 150 has influence on the degree of correlation between radiation patterns. For example, when the refractive index of the dielectric constituting the lens structure 150 increases, the degree of correlation between radiation patterns may decrease in proportion to the refractive index. To summarize, the material and thickness of the lens structure 150 has influence on a reduction in the degree of correlation between radiation patterns.

FIG. 4B is an example of a graph showing the channel capacity of a 4-port integrated antenna including a lens structure. FIG. 4B shows an increase in channel capacity caused by a reduction in the degree of correlation. The simulation is based on the assumption of full scattering and non-line-of-fight (NLOS) environments. A total channel matrix H may be presented by Equation 2 below.

$$H = R_t^{1/2} H_w R_r^{1/2}$$ [Equation 2]

Here, matrices $R_t$ and $R_r$ are elements of a correlation matrix $R_{t,(i,j)} = \rho_{(ij)}$ and thus contribute to an improvement in the rank of the total channel H separately from an environment channel matrix Hw of a system. Although the effect is slightly reduced in a line-of-sight (LoS) environment, a change in phase caused by the lens structure improves the independence between antenna signals. Accordingly, the ranks of the matrices $R_t$ and $R_r$ are improved, and the channel capacity is increased.

FIG. 5 is an example of a table for analyzing the degrees of correlation of a 4-port integrated antenna including a lens structure. FIG. 5 shows an analysis example of the degrees of correlation for the antenna 100 including the lens structure and a general 4-port antenna 50. The lens antenna 100 is assumed to use a Flame Retardant 4 (FR-4) substrate having a thickness of 3 cm as a lens. FIG. 5 shows the absolute values of correlation matrices $R_t$ of the general antenna 50 and the lens antenna 100. Also, FIG. 5 shows eigenvalues obtained by performing singular-value decomposition on the correlation matrices. Referring to FIG. 5, it is possible to see that the degrees of correlation of the lens antenna 100 are significantly lower than those of the general antenna 50.

The lens antenna 100 changes the phase information of an electromagnetic wave output by an antenna unit using the lens structure 150. In this way, the channel capacity of the integrated antenna is increased. The channel capacity is increased in two aspects. One is to add a channel by making radiation patterns emitted by a plurality of antenna units different from each other. The other is to add a channel by reducing interference between electromagnetic waves emitted by a plurality of antenna units.

FIG. 6 is a set of examples showing the structure of a lens antenna. FIG. 6 shows some examples of a 4-port antenna structure.

An antenna 200 of FIG. 6A includes four antenna units $P_1$, $P_2$, $P_3$, and $P_4$ and a lens structure 250. Like in FIG. 2, some of the antenna units $P_1$, $P_2$, $P_3$, and $P_4$ may have identical or similar polarization characteristics. Alternatively, some of the antenna units $P_1$, $P_2$, $P_3$, and $P_4$ may have radiation patterns identical to each other. For example, the antenna units $P_1$ and $P_3$ may have the same polarization characteristic or radiation pattern. Also, the antenna units $P_2$ and $P_4$ may have the same polarization characteristic or radiation pattern. In this case, the lens structure 250 may be applied only to the antenna units $P_3$ and $P_4$. The lens structure 250 is disposed so that only electromagnetic waves of the antenna units $P_3$ and $P_4$ pass through the lens structure 250. In the antenna 200 having the above structure, the degree of correlation between the antenna units $P_1$ and $P_3$ (or the antenna units $P_2$ and $P_4$) is reduced so that the channel capacity is increased.

It is assumed that the antenna units $P_1$ and $P_3$ emit electromagnetic waves in a first radiation pattern and the antenna units $P_2$ and $P_4$ emit electromagnetic waves in a second radiation pattern. The antenna 200 changes radiation patterns emitted from the antenna units $P_3$ and $P_4$ through the lens structure 250. Consequently, the degrees of correlation between the radiation patterns of the antenna units $P_1$, $P_2$, $P_3$, and $P_4$ are reduced.

An antenna 300 of FIG. 6B includes four antenna units $P_1$, $P_2$, $P_3$, and $P_4$ and two lens structures 351 and 352. Like in FIG. 2, some of the antenna units $P_1$, $P_2$, $P_3$, and $P_4$ may have identical or similar polarization characteristics. Alternatively, some of the antenna units $P_1$, $P_2$, $P_3$, and $P_4$ may have radiation patterns identical to each other. For example, the antenna units $P_1$ and $P_3$ may have the same polarization characteristic or radiation pattern. Also, the antenna units $P_2$ and $P_4$ may have the same polarization characteristic or radiation pattern. The antenna 300 applies the different lens structures 351 and 352 to the antenna units $P_1$ and $P_2$ and the antenna units $P_3$ and $P_4$, respectively. The lens structures 351 and 352 have different refractive indices. In this case, the lens structures 351 and 352 change the phase information of electromagnetic waves of the antenna units $P_1$ and $P_2$ and the antenna units $P_3$ and $P_4$ to be the same, respectively. Accordingly, in the antenna 300 having the above structure, the degree of correlation between the antenna units $P_1$ and $P_3$ (or the antenna units $P_2$ and $P_4$) is reduced so that the channel capacity is increased.

An antenna 400 of FIG. 6C includes four antenna units $P_1$, $P_2$, $P_3$, and $P_4$ and three lens structures 451, 452, and 453. All the antenna units $P_1$, $P_2$, $P_3$, and $P_4$ may have identical or similar polarization characteristics. Alternatively, all the antenna units $P_1$, $P_2$, $P_3$, and $P_4$ may have identical or similar radiation patterns. The antenna 400 applies the different lens structures 451, 452, and 453 to the antenna units $P_1$, $P_4$, and $P_3$, respectively. The lens structures 451, 452, and 453 have different refractive indices. In other words, the lens structures 451, 452, and 453 change the phase information of electromagnetic waves of the antenna units $P_1$, $P_4$, and $P_3$ to be different from one another, respectively. As a result, in the antenna 400 having the above structure, the degrees of correlation between all the antenna units $P_1$, $P_2$, $P_3$, and $P_4$ are reduced.

An antenna 500 of FIG. 6D includes four antenna units $P_1$, $P_2$, $P_3$, and $P_4$ and four lens structures 551, 552, 553, and 554. All the antenna units $P_1$, $P_2$, $P_3$, and $P_4$ may have identical or similar polarization characteristics. Alternatively, all the antenna units $P_1$, $P_2$, $P_3$, and $P_4$ may have identical or similar radiation patterns. The antenna 500 applies the different lens structures 551, 552, 553, and 554 to the antenna units $P_1$, $P_2$, $P_4$, and $P_3$, respectively. The lens structures 551, 552, 553, and 554 have different refractive indices. In other words, the lens structures 551, 552, 553, and 554 change the phase information of electromagnetic waves of the antenna units $P_1$, $P_2$, $P_4$, and $P_3$ to be different from one another, respectively. As a result, in the antenna 500 having the above structure, the degrees of correlation between all the antenna units $P_1$, $P_2$, $P_3$, and $P_4$ are reduced.

As described above, the antenna 200, 300, 400, or 500 employing a lens structure may minimize interference between antenna units. In this way, the antenna 200, 300, 400, or 500 employing a lens structure may increase the channel capacity. Further, the antenna 200, 300, 400, or 500 employing a lens structure may use multiple channels using radiation patterns having different characteristics. When there are four antenna units as shown in FIG. 6, it is possible to use four channels. The antenna 200, 300, 400, or 500 employing a lens structure may separately transmit different packets through the four channels. Further, the antenna 200, 300, 400, or 500 employing a lens structure may perform multiple-input multiple-output (MIMO) communication using the four channels. When the antenna 200, 300, 400, or 500 shown in FIG. 6 is used for MIMO communication, MIMO gain is increased by adding a lens structure which is a relatively simple element.

Figure 7:
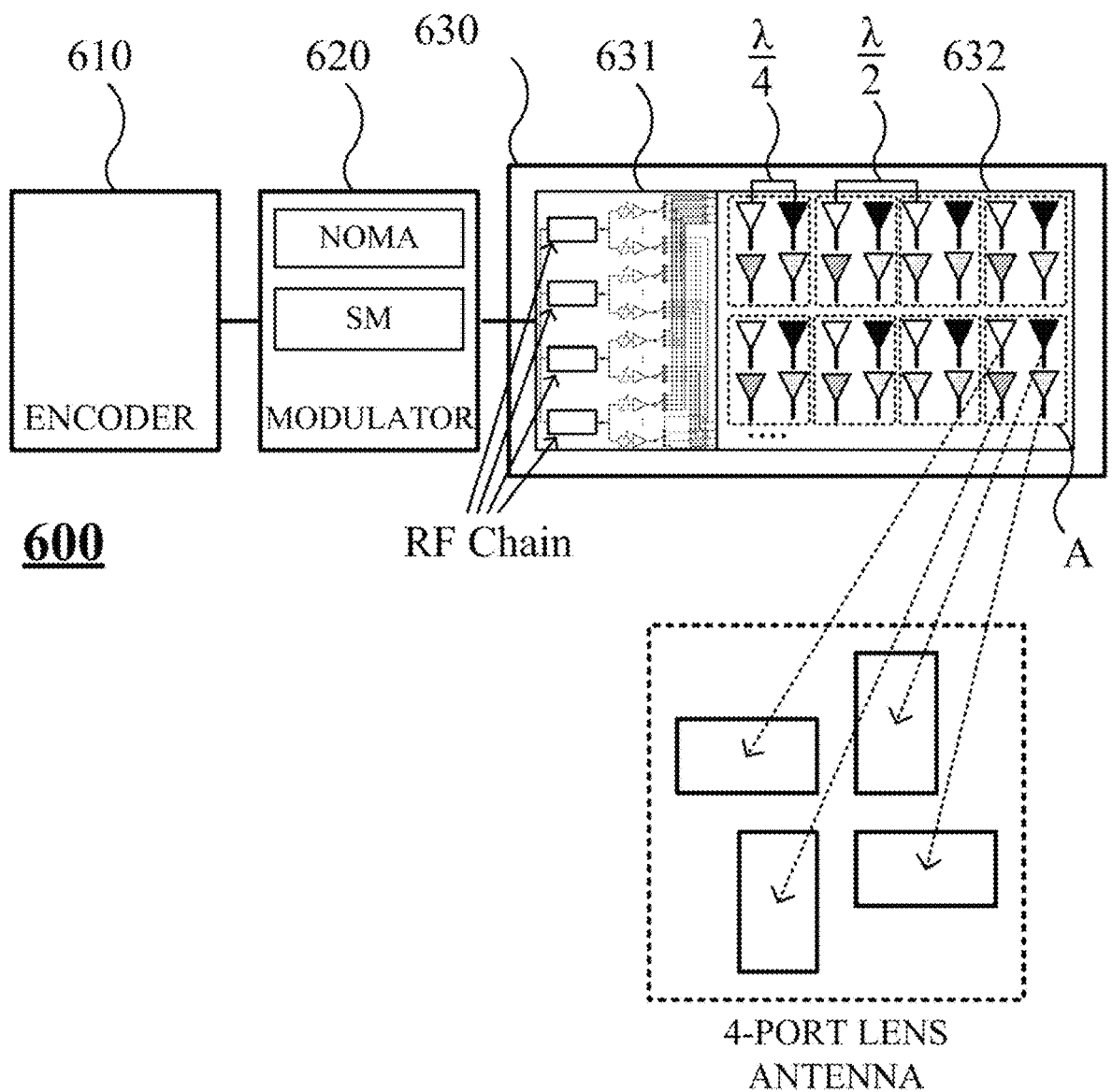
FIG. 7 illustrates an example of the structure of a transmitter employing a lens antenna.

FIG. 7 is an example showing the structure of a transmitter 600 employing a lens antenna. The transmitter 600 employs the above-described lens antenna, that is, a multi-lens antenna with a high degree of integration. The transmitter 600 includes an encoder 610, a modulator 620, and an antenna system 630.

The encoder 610 may receive a bit stream and encode the input bit stream according to a preset encoding method.

The modulator 620 may receive a signal output by the encoder 610 and generate modulation symbols on the basis of a preset signal modulation scheme. As the signal modulation scheme, the modulator 620 may use at least one of binary phase shift keying (BPSK), quadrature phase shift keying (QPSK), quadrature amplitude modulation (QAM), phase shift keying (PSK), amplitude shift keying (ASK), and frequency shift keying (FSK).

The modulator 620 may map the signal (the bit stream or data) output by the encoder 610 to at least one of a plurality of antennas. The modulator 620 may determine an antenna (antenna identifier) to be used for data transmission at a current time point. In this case, the modulator 620 may transfer antenna information to be used for data transmission to the antenna system 630 in the transmitter 600.

The modulator 620 may perform signal processing based on NOMA and SM. The modulator 620 may determine which one of the plurality of antennas will be selected to transmit a signal for SM.

The antenna system 630 includes a controller 631 and a multi-lens antenna 632. The controller 631 controls the signal (data) transferred from the modulator 620 to be transferred to the multi-lens antenna 632. The controller 631 may include wires, switches, and the like. The controller 631 selects an antenna which will transmit a currently input signal on the basis of information transferred from the modulator 620 or another control element and controls a path.

The multi-lens antenna 632 is an antenna in which the above-described lens antenna is integrated. FIG. 7 shows 4-port antennas as an example. A 4-port antenna may be referred to as one unit antenna. In FIG. 7, 4-port antennas (unit antennas) are distinguished by dotted lines. FIG. 7 shows that a unit antenna A corresponds to four port antennas. The controller 631 may select a unit antenna which will transmit a signal from among the plurality of unit antennas. Also, the controller 631 may select an antenna (in FIG. 7, one of four antennas) which will transmit a signal from one unit antenna.

A plurality of antennas are arranged like an array antenna. According to characteristics of an SM system, it is possible to integrate four or more antennas within an interval of $\lambda/2$. Adjacent 4-port antennas (unit antennas) may be arranged at intervals of $\lambda/2$ or less. In other words, one 4-port antenna may be considered to be disposed in an area of $\lambda/2 \times \lambda/2$ size.

In the controller 631, one switch transfers an input signal to any one of 4-port antennas.

The controller 631 may have the same data transferred to different antennas. Further, the controller 631 may have different data transferred to different antennas. The latter is referred to as generalized SM (GSM) among SM techniques.

The modulator 620 or the controller 631 may determine (select) a unit antenna which will transmit data at a current time point according to SM among the plurality of unit antennas. A unit antenna which will transmit data in an SM manner is referred to as a target unit antenna. A target unit antenna may be one or more unit antennas.

The modulator 620 or the controller 631 may determine a target unit antenna among the plurality of unit antennas on the basis of directivity. In other words, the modulator 620 or the controller 631 may select a first antenna group having the same directivity from among the plurality of unit antennas and control the unit antenna group to transmit data. In this case, unit antennas belonging to the first antenna group have identical or similar directivities. In some cases, the modulator 620 or the controller 631 may select a second antenna group having different directivities from among the plurality of unit antennas and control the target unit antennas to transmit data. In this case, antenna units belonging to the second antenna group have different directivities each other.

Target unit antennas selected for SM may transmit data in the same frequency band according to NOMA.

To support mobility of a terminal which performs MIMO communication, the modulator 620 or the controller 631 may select unit antennas having different directivities from among the plurality of unit antennas. Meanwhile, the modulator 620 or the controller 631 may select a target unit antenna for beamforming to a terminal which performs MIMO communication.

Figure 8:
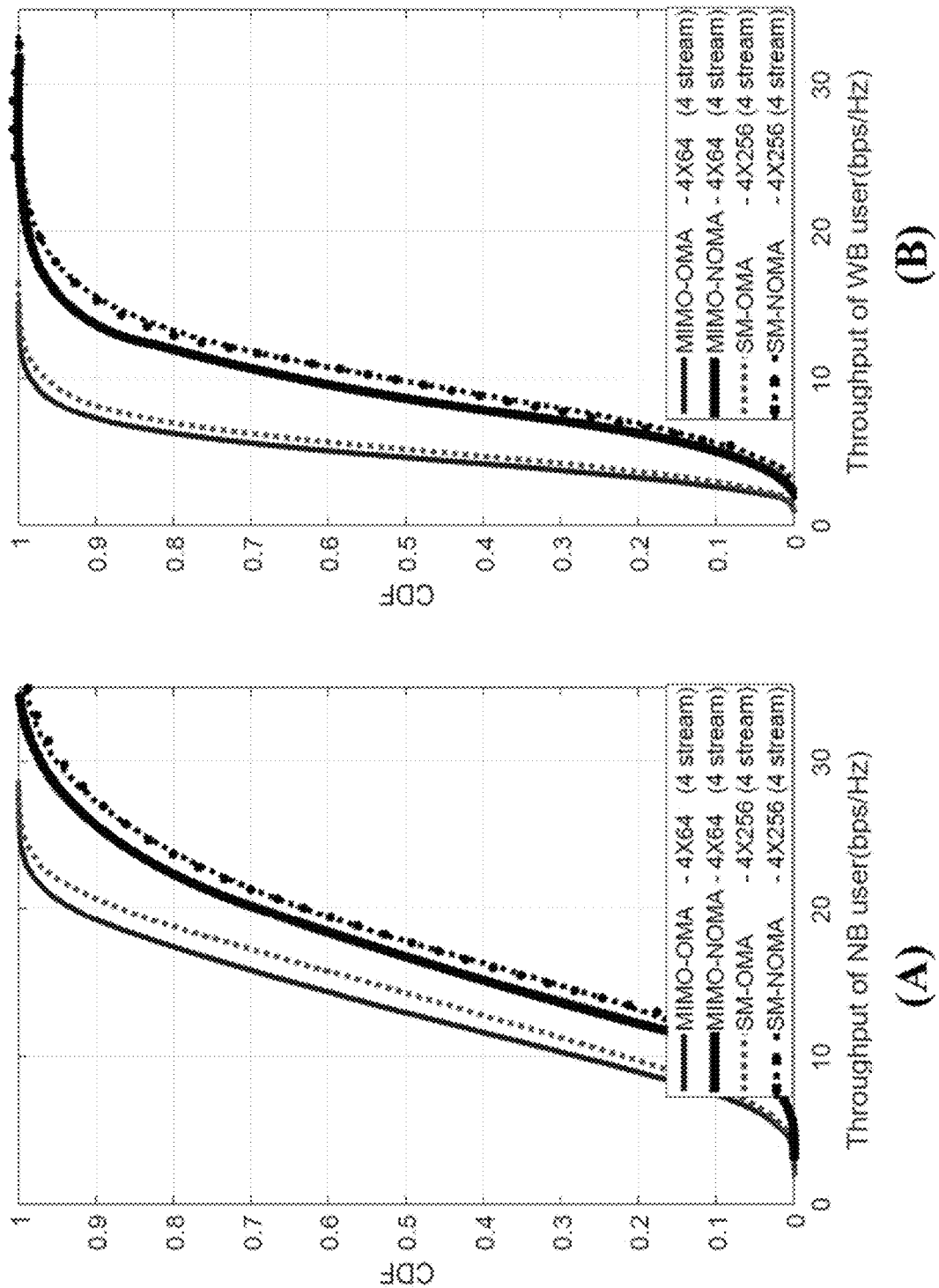
FIG. 8 illustrates an example of a cumulative distribution function (CDF) of a non-orthogonal multiple access (NOMA) system to which spatial modulation (SM) has been applied.

FIG. 8 is an example of a cumulative distribution function (CDF) of a NOMA system to which SM has been applied. A beam shape supported by a NOMA system to which SM is applied is determined according to the channel state of a user (terminal), and the user is supported according to the determined beam shape (narrow beam (NB) or wide beam (WB)). However, referring to FIG. 8, it is possible to see that all users have CDFs of stable capacity regardless of a supported shape and in particular, the proposed SM-based NOMA system have CDFs of the highest capacity in the both cases.

Figure 9:
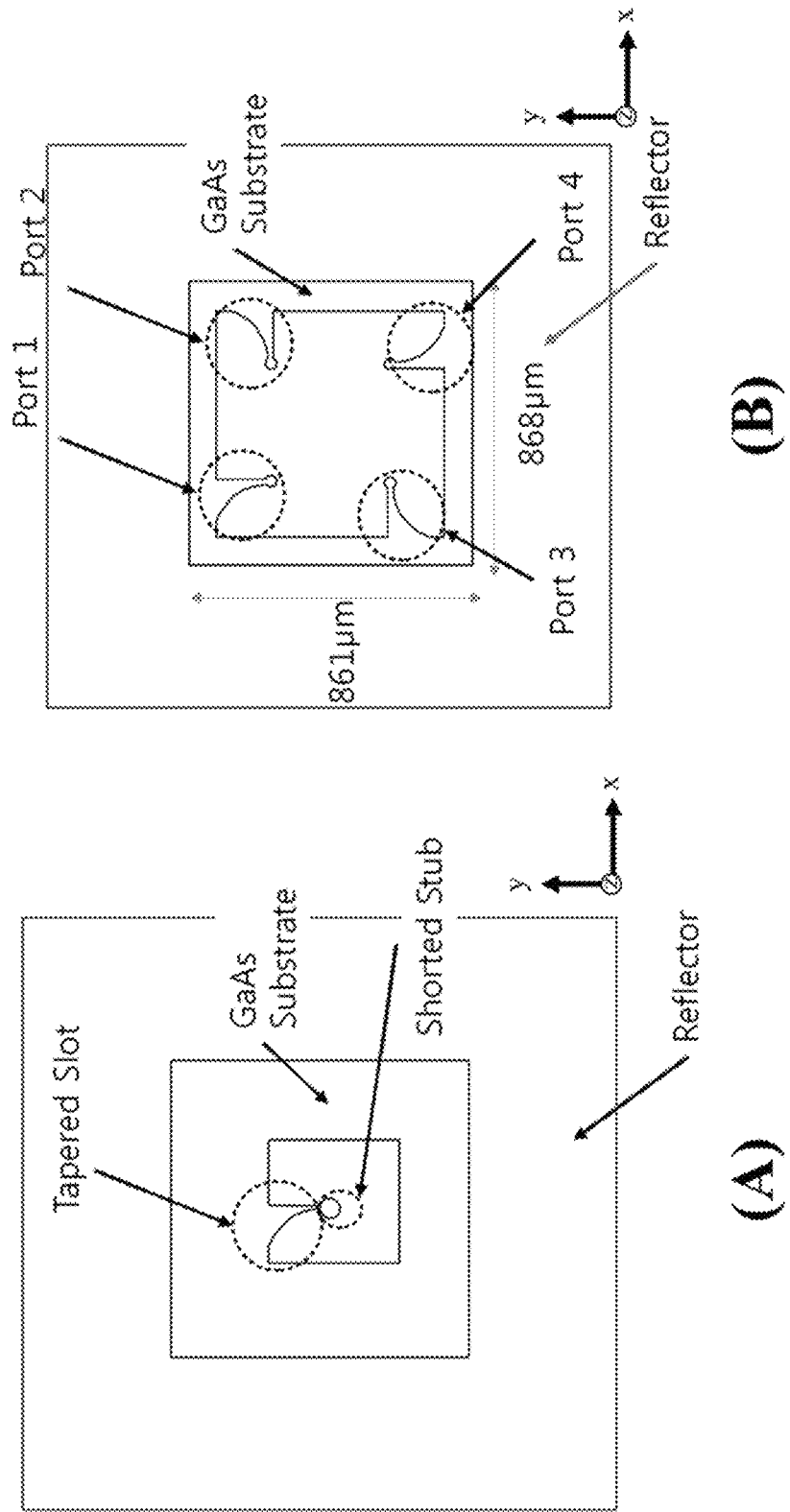
FIG. 9 illustrates an example of the structure of a 4-port integrated antenna.

FIG. 9 is an example of a unit antenna. FIG. 9 is an example of the structure of a 4-port integrated antenna. A unit antenna includes a plurality of antenna units. FIG. 9 is an example in which a linear-tapered slot antenna (LTSA) is used. FIG. 9 is an example of an antenna structure designed for a frequency of 140 GHz.

FIG. 9A is an example of the structure of one antenna unit constituting an integrated antenna. FIG. 9B is an example of the structure of a 4-port integrated antenna including four unit antenna units. FIG. 9B is an example of a 4-port integrated antenna integrated in an area of $0.405\lambda \times 0.405\lambda$ size where $\lambda$ is a wavelength. FIG. 9B shows port 1, port 2, port 3, and port 4.

FIG. 10 shows examples of radiation patterns of the 4-port integrated antenna of FIG. 9. There are examples of radiation patterns of port 1, port 2, port 3, and port 4. FIG. 10A is an example of a radiation pattern of a port 1 antenna unit. FIG. 10B is an example of a radiation pattern of a port 2 antenna unit. FIG. 10C is an example of a radiation pattern of a port 3 antenna unit. FIG. 10D is an example of a radiation pattern of a port 4 antenna unit. Referring to FIG. 10, the antenna ports form beam patterns having different directivities and shapes.

Figure 11:
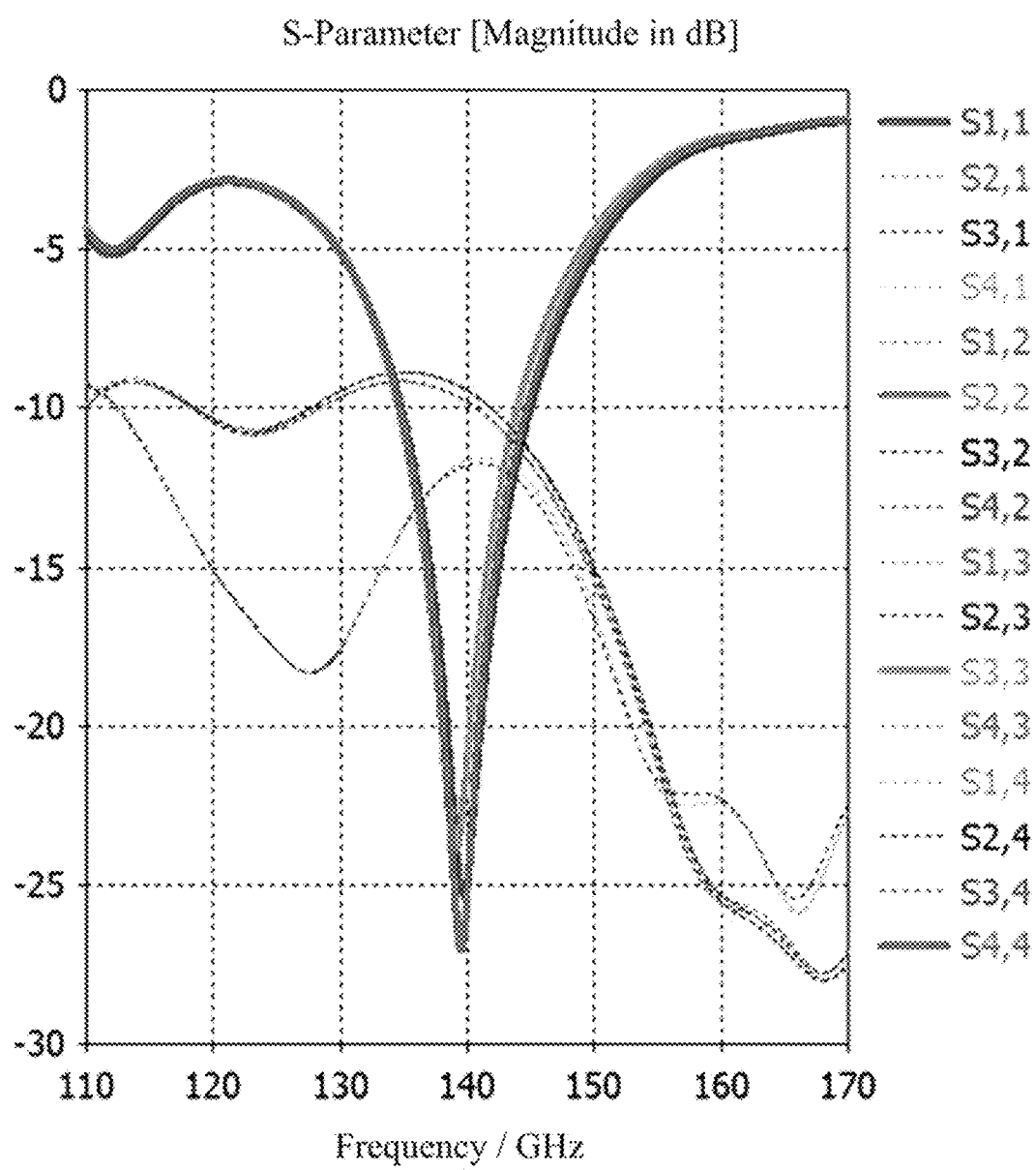
FIG. 11 illustrates an example of an S-parameter of the 4-port integrated antenna of FIG. 9.

FIG. 11 is an example of an S-parameter of the 4-port integrated antenna of FIG. 9. An S-parameter denotes a ratio of an output voltage to an input voltage in a frequency distribution. In the graph of FIG. 11, the horizontal axis denotes frequency, and the vertical axis denotes dB. For example, S1,1 denotes a case in which a voltage input from port 1 is output to port 1. In the case of (i) S1,1, (ii) S2,2, (iii) S3,3, and (iv) S4,4, a maximum voltage is output from an input voltage at 140 GHz. Consequently, it is possible to see that each individual antenna unit effectively operates at a targeted frequency of 140 GHz.

The above-described antenna system or transmitter may use antenna spreading in an SM system on the basis of characteristics of an integrated pattern polarization or lens antenna or an array antenna. When the integrated array antennas have different directivities, it is possible to support mobility of customers by optimally allocating the integrated array antennas.

When multiple antennas having different directivities are used, it is possible to use an antenna spreading scheme to support mobility of users. However, when it is intended to increase capacity rather than to support mobility, it is possible to support users through beamforming in which the channels of the users are taken into consideration. In this case, the antenna system or transmitter may perform beamforming by grouping antennas which are optimized for the user channels rather than antennas having different directivities among multiple different antennas. In this way, the capacity can be increased compared to that of an existing method.

Figure 12:
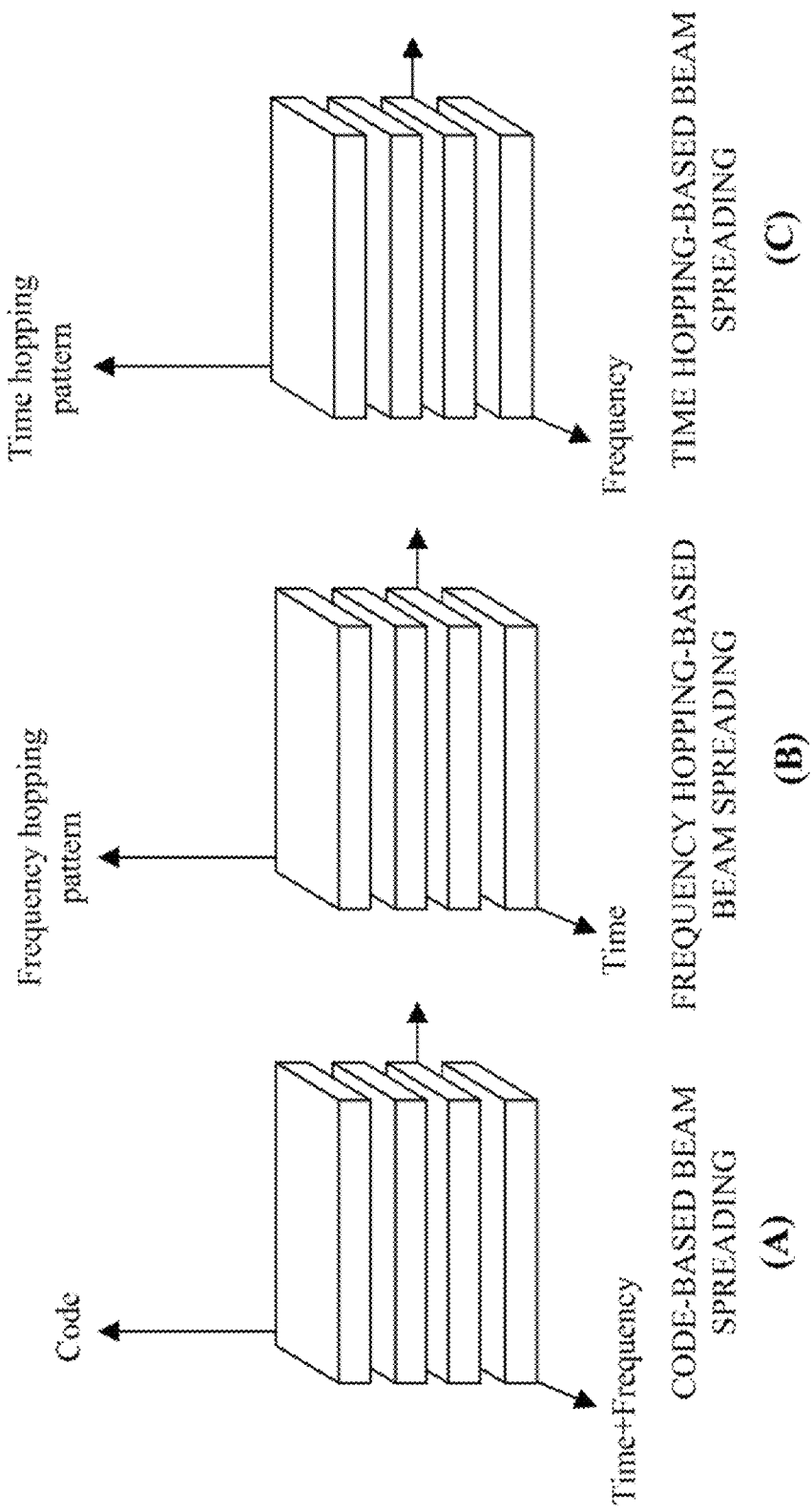
FIG. 12 illustrates examples of beam spreading.

When beamforming is performed by using multiple antennas having different directivities, it is possible to increase the capacity. However, it is not possible to use antenna spreading, and thus mobility may be problematic. To solve this problem, it is possible to apply time spreading, frequency spreading, and code spreading techniques as shown in FIG. 12. FIG. 12 shows examples of beam spreading. FIG. 12A shows code spreading, FIG. 12B shows frequency spreading, and FIG. 12C shows time spreading.

The above-described transmitter or communication apparatus applies SM in an environment in which antennas can be integrated, and a method is proposed to group optimal antennas together among integrated antennas having different directivities by considering the channel environments of users. In this way, antennas can be flexibly grouped together according to the channel situation of a user, and thus it is possible to stably support mobility of the user while maintaining the channel capacity of the user. To maximize a capacity increase, beamforming can be performed by using antennas having different directivities, and time hopping-based beam spreading, code-based beam spreading, frequency hopping-based beam spreading, etc. using switches which can be rapidly switched may be used to support mobility.

Figure 13:
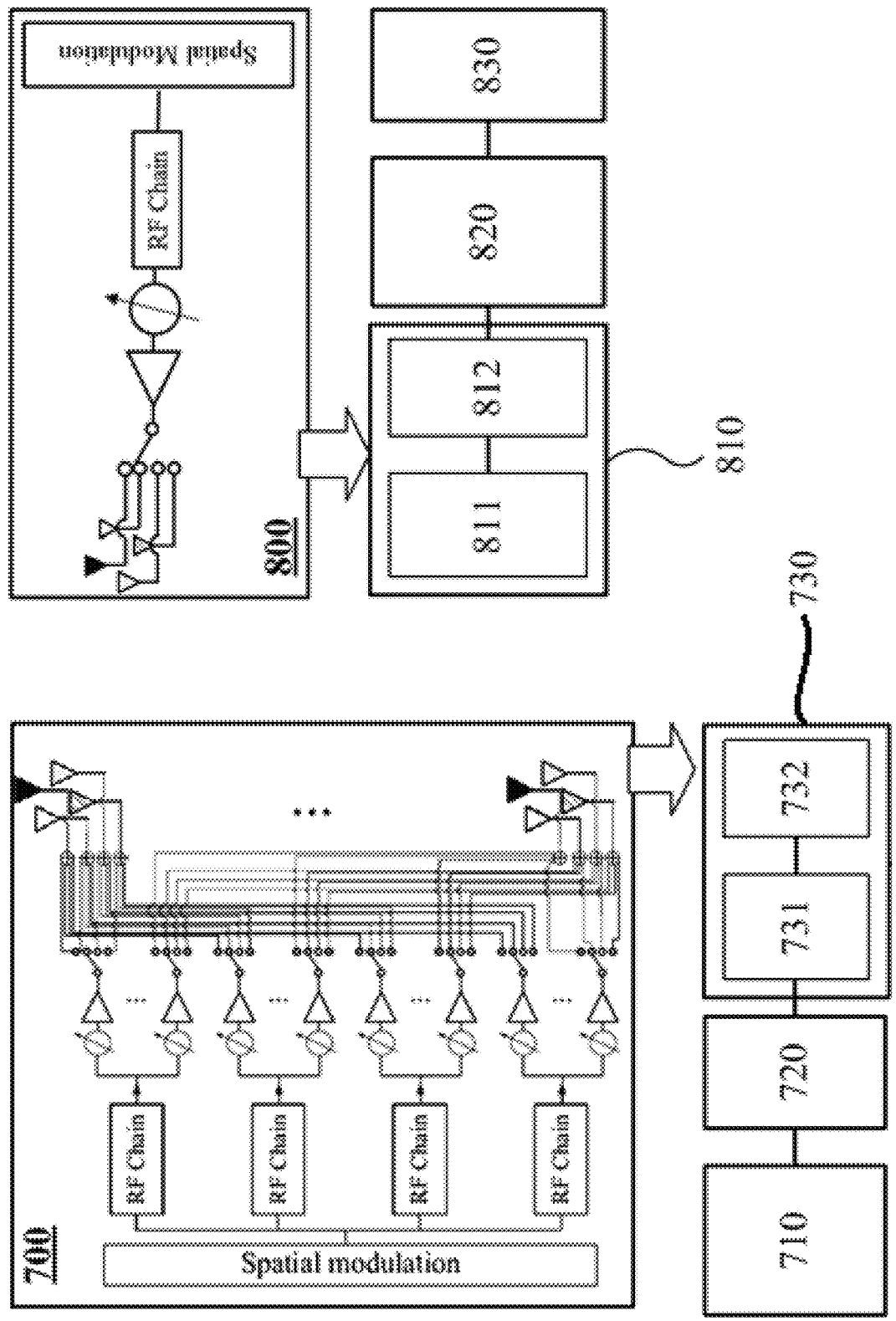
FIG. 13 illustrates an example of the structures of a transmitter employing a lens antenna and a receiver.

FIG. 13 is an example of the structures of a transmitter employing a lens antenna and a receiver. This may be used as a standard communication method. FIG. 13 shows an example of a transmitter 700 employing a lens antenna and a receiver 800. The transmitter 700 is an apparatus corresponding to the transmitter 600 of FIG. 7. The transmitter 700 includes an encoder 710, a modulator 720, and an antenna system 730. The antenna system 730 includes a controller 731 and a multi-lens antenna 732. Elements identical to those described in FIG. 7 will not be described again.

The transmitter 700 selects a target unit antenna which will transmit a signal at a current time point in an SM manner. The transmitter 700 may transmit a signal to the target unit antenna using the controller 731. Also, the transmitter 700 may transmit a signal only through any one (or more) of antenna units belonging to the target unit antenna.

The transmitter 700 may transmit data according to NOMA.

The multi-lens antenna 732 includes a plurality of unit antennas. Among the plurality of unit antennas, adjacent unit antennas may be disposed at an interval of a half wavelength ($\lambda/2$) or less.

The controller 731 performs control so that identical data included in data output by the modulator 720 may be transferred to the target unit antenna or different data may be transferred to the target unit antenna. The target unit antenna denotes an antenna selected from among the plurality of unit antennas by the controller 731 to transmit data in an SM manner at a specific time point.

The controller 731 may determine the target unit antenna among the plurality of unit antennas on the basis of directivity.

To support mobility of a terminal which performs MIMO communication, the controller 731 may select unit antennas having different directivities from among the plurality of unit antennas.

The controller 731 may select the target unit antenna for beamforming to a terminal which performs MIMO communication. In this case, the modulator 720 may support at least one of time spreading, frequency spreading, and code spreading to support mobility of a terminal.

The controller 731 may group antennas having different directivities together among the plurality of unit antennas and perform beamforming for a specific receiver by using unit antennas belonging to the same group.

The controller 731 may perform beamforming by selecting unit antennas having different directivities from among the plurality of unit antennas as the target unit antenna. In this case, the modulator 720 may support at least one of time spreading, frequency spreading, and code spreading for the target unit antenna.

The receiver 800 includes an antenna system 810, a demodulator 820, and a decoder 830. The antenna system 810 may include a lens antenna 811 and a controller 821. FIG. 13 shows a structure in which the lens antenna 811 corresponds to one unit antenna of the transmitter 700. The receiver 800 receives a signal using an antenna unit corresponding to the unit antenna through which the transmitter 700 has transmitted the signal. In other words, the receiver 800 receives the signal through an antenna unit which may well receive a radiation pattern that the transmitter 700 has used for signal transmission. The receiver 800 may acquire information on a radiation pattern or a type of antenna used for signal transmission in advance or before packet transmission. The controller 812 corresponds to an element which determines an antenna or a path which will be used to receive a signal among the plurality of antenna units. The controller 812 may include a switch, signal paths, and the like. The demodulator 820 is an element corresponding to the modulator 720 and may demodulate the signal through the reverse process of the modulation scheme. The decoder 830 decodes data from the demodulated signal. The decoder 830 may decode the signal through the reverse process of a method used by the encoder 710.

The SM-based communication method employing a lens antenna as described above may be implemented as a program (or application) including an algorithm executable in a computer. The program may be stored and provided in a non-transitory computer-readable medium.

The non-transitory computer-readable medium means a medium which stores data semi-permanently and can be read by a device rather than a medium which stores data for a short time such as register, cache, or memory. Specifically, the above-described various applications or programs may be provided by being stored in non-transitory computer-readable media such as compact discs (CDs), digital versatile discs (DVDs), hard disks, blu-ray discs, universal serial bus (USB) memory, memory cards, and read-only memories (ROMs).

Some applications to which the above-described antenna system or communication apparatus is applied will be described below.

Capacity Increase and Mobility Support of Outdoor Ultra-Massive MIMO System

In outdoor environments, there are users having various channels. To support the users, high capacity and a stable mobility support method are required. The present disclosure employs an SM scheme in an integrated antenna-based NOMA system to stably support channel capacity and mobility. It is possible to increase channel capacity through an integrated pattern polarization or lens antenna or an array antenna in an orthogonal multiple access or NOMA method and stably support mobility by grouping antennas having different directivities together. Also, it is possible to support optimal beamforming by adaptively reflecting the channel situation of a user, and in this case, mobility can be supported by using code, time, and frequency spreading on multiple beams.

Capacity Increase and Mobility Support of Indoor Ultra-Massive MIMO System

In indoor environments, the number of scatters is limited, and the characteristics of a LoS environment are strengthened. In this case, even if a simple massive MIMO environment is applied, a capacity increase is limited because of the LoS environment. To solve this problem, even in a LoS environment, a pattern polarization or lens integrated antenna or an array antenna may be applied to an orthogonal multiple access system and a NOMA system in order to obtain sufficient gain. Accordingly, even in a LoS environment, it is possible to obtain stable channel capacity gain and robustness against the location of an indoor user. In this case, mobility can be supported by applying code, time, and frequency spreading to multiple beams, and it is possible to use various antennas so that shaded areas may be reduced.

Cooperative Autonomous Driving Network

In a cooperative autonomous driving network environment, the same information is provided to all vehicles in many cases, and information is generally transmitted in a broadcast manner. The present disclosure employs NOMA and allows not only broadcasting but also data transmission suitable for vehicles. Further, it is possible to stably support autonomous vehicles which show high mobility by grouping antennas having different directivities. In the case of estimating the channel information and travel route of a user, it is possible to support a user through beamforming using multiple antennas and to support mobility by applying code, time, and frequency spreading.

According to the above-described present disclosure, a lens antenna is used. Accordingly, although a NOMA system and SM are used, channel capacity is high. The above-described present disclosure supports mobility of a terminal through optimal grouping of multiple antennas.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A spatial modulation-based transmitter employing a lens antenna, the transmitter comprising:
   a plurality of unit antennas;
   a modulator configured to perform non-orthogonal multiple access and spatial modulation for an input signal; and
   a controller configured to determine a target unit antenna which will transmit data in a spatial modulation manner at a current time point among the plurality of unit antennas,
   wherein each of the unit antennas includes a plurality of antenna units and a lens structure which shifts a phase of an electromagnetic wave output by at least one of the plurality of antenna units, wherein the lens structure shifts the phase so that the plurality of antenna units have different radiation patterns, and wherein lens structures, which are identical to the lens structure and disposed on antenna units outputting identical radiation patterns among the plurality of antenna units, have different refractive indices.

2. The spatial modulation-based transmitter of claim 1, wherein the transmitter transmits data according to non-orthogonal multiple access, and each of the unit antennas includes a plurality of antenna units disposed at intervals of a half wavelength ($\lambda/2$) or less.

3. The spatial modulation-based transmitter of claim 1, wherein the controller performs control so that identical data included in data output by the modulator is transferred to the target unit antenna or different data is transferred to the target unit antenna.

4. The spatial modulation-based transmitter of claim 1, wherein the controller determines the target unit antenna among the plurality of unit antennas on the basis of directivity.

5. The spatial modulation-based transmitter of claim 4, wherein for spatial modulation, target unit antennas identical to the determined target unit antenna transmit data in the same frequency band according to non-orthogonal multiple access.

6. The spatial modulation-based transmitter of claim 1, wherein the controller selects unit antennas having different directivities from among the plurality of unit antennas to support mobility of a terminal which performs multiple-input multiple-output (MIMO) communication.

7. The spatial modulation-based transmitter of claim 1, wherein the controller selects the target unit antenna for beamforming to a terminal which performs multiple-input multiple-output (MIMO) communication, and the modulator supports at least one of time spreading, frequency spreading, and code spreading to support mobility of the terminal.

8. The spatial modulation-based transmitter of claim 1, wherein the controller groups unit antennas having different directivities together among the plurality of unit antennas and performs beamforming for a specific receiver by using unit antennas belonging to the same group.

9. The spatial modulation-based transmitter of claim 1, wherein the controller selects unit antennas having different directivities as the target unit antenna among the plurality of unit antennas and performs beamforming, and the modulator supports at least one of time spreading, frequency spreading, and code spreading for the target unit antenna.

10. A spatial modulation-based communication method employing a lens antenna, the method comprising:

performing, by a multi-antenna system, non-orthogonal multiple access and spatial modulation for an input signal;

determining, by the multi-antenna system, a target unit antenna which will transmit data in a spatial modulation manner at a current time point among a plurality of unit antennas; and transmitting, by the multi-antenna system, spatially modulated data through the target unit antenna, wherein each of the unit antennas includes a plurality of antenna units and a lens structure which shifts a phase of an electromagnetic wave output by at least one of the plurality of antenna units, wherein the lens structure shifts the phase so that the plurality of antenna units have different radiation patterns, and wherein the multi-antenna system determines the target unit antenna among the plurality of unit antennas on the basis of directivity.

11. The spatial modulation-based communication method of claim 10, wherein the multi-antenna system transmits data according to non-orthogonal multiple access, and each of the unit antennas includes a plurality of antenna units disposed at intervals of a half wavelength ($\lambda/2$) or less.

12. The spatial modulation-based communication method of claim 10, wherein the multi-antenna system transmits identical data to all antenna units belonging to the target unit antenna or transmits different data to the antenna units.

13. The spatial modulation-based communication method of claim 10, wherein lens structures, which are identical to the lens structure and disposed on antenna units outputting identical radiation patterns among the plurality of antenna units, have different refractive indices.

14. The spatial modulation-based communication method of claim 10, wherein for spatial modulation, target unit antennas identical to the determined target unit antenna transmit data in the same frequency band according to non-orthogonal multiple access.

15. The spatial modulation-based communication method of claim 10, wherein the multi-antenna system selects unit antennas having different directivities from among the plurality of unit antennas to support mobility of a terminal which performs multiple-input multiple-output (MIMO) communication.

16. The spatial modulation-based communication method of claim 10, wherein the multi-antenna system selects the target unit antenna for beamforming to a terminal which performs multiple-input multiple-output (MIMO) communication and supports at least one of time spreading, frequency spreading, and code spreading to support mobility of the terminal.

17. The spatial modulation-based communication method of claim 10, wherein the multi-antenna system groups unit antennas having different directivities together among the plurality of unit antennas and performs beamforming for a specific receiver by using unit antennas belonging to the same group.

18. The spatial modulation-based communication method of claim 10, wherein the multi-antenna system selects unit antennas having different directivities as the target unit antenna among the plurality of unit antennas to perform beamforming and supports at least one of time spreading, frequency spreading, and code spreading for the target unit antenna.

* * * * *